Jan. 19, 1971   E. A. SCHONBERG ET AL   3,556,896
METHOD OF BONDING EMPLOYING A NITROGENOUS PLASTIC FILM
Filed May 3, 1968
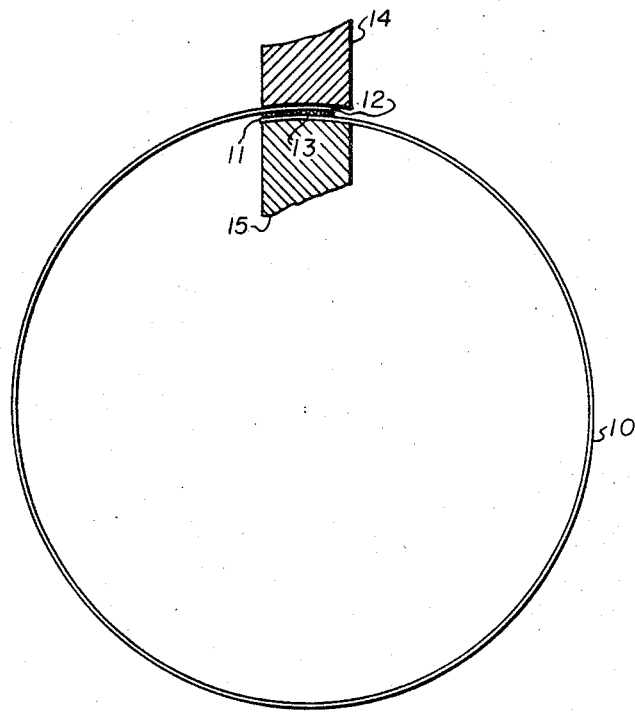
INVENTORS
ELLIOTT A. SCHONBERG
ALBERT H. STEINBERG
PHILIP S. BOLLEN
BY
ATTORNEY

United States Patent Office 3,556,896
Patented Jan. 19, 1971

3,556,896
METHOD OF BONDING EMPLOYING A NITROGENOUS PLASTIC FILM
Elliot A. Schonberg, East Orange, Albert H. Steinberg, Morris Plains, and Philip S. Bollen, Boonton, N.J., assignors to Allied Chemical Corporation, New York, N.Y., a corporation of New York
Filed May 3, 1968, Ser. No. 726,505
Int. Cl. C09j 7/00
U.S. Cl. 156—309                                6 Claims

ABSTRACT OF THE DISCLOSURE

This invention relates to the use as an adhesive of a low-crystalline plastic film made from a graft copolymer of e-caprolactam onto an ethylene-ethyl acrylate backbone. This graft copolymer is formed by grafting e-caprolactam onto 10-25% by weight of a backbone copolymer preferably made from about 18% by weight ethyl acrylate and a corresponding about 82% ethylene. This graft copolymer has been found to be particularly useful as a low-crystalline adhesive film for adhering metals and particularly for forming the side seams of coated steel cans, providing superior adhesion and leak resistance.

BACKGROUND OF THE INVENTION

Field of the invention

This application relates to the field of plastic film adhesives and more particularly to the use of such adhesives for forming the side seams of coated steel cans and similar containers.

Description of the prior art

It is known in the art to use an adhesive to form the side seams of cans. It is also known to use a plastic in film form as an adhesive for the side seams of cans. However, previous adhesives have the disadvantages that they are expensive, the containers formed therewith have a relatively high incidence of leakage, they require extensive modification of existing can making machinery before they can be used, and they are slow to adhere and thus limit the speed of the can-forming line.

SUMMARY OF THE INVENTION

It is an object of this invention to provide a relatively inexpensive adhesive particularly adaptable to use in adhering metals.

It is another object of this invention to provide an adhesive which is particularly adaptable to use in can making.

It is another object of this invention to provide such an adhesive in easily handleable film form.

It is still another object of this invention to provide a film adhesive to which existing can making processes and equipment can be readily adapted.

It is still a further object of this invention to provide a film adhesive which produces a high degree of adherence, a rapid bond and a strong seal and thus results in very few or no leaking containers and allows use of increased speeds on can-forming lines.

Finally it is an object of this invention to provide a film adhesive which is unexpectedly superior to existing film adhesives in the above properties.

SUMMARY OF THE INVENTION

Briefly, applicants' invention involves the use of a certain low-crystalline graft copolymer film as an adhesive.

The graft copolymer used in the adhesive film of this invention is the subject of copending commonly assigned U.S. patent application No. 436,685 filed Mar. 2, 1965 by Raymond Kray and Richard Bellet. The subject matter of that application is incorporated herein by reference.

Briefly, the graft copolymer described in the above-mentioned copending application comprises e-caprolactam grafted onto a backbone of about 10-25% by weight of a copolymer preferably containing about 18% ethyl acrylate and a corresponding about 82% ethylene. The graft copolymer is formed by dispersing the ethylene-ethyl acrylate copolymer in molten e-caprolactam at about 255° C. The reaction mixture is maintained at that temperature in an inert atmosphere for about 12 hours and then extruded at a temperature between about 242° and 250° C. and at a pressure between about 850 and 1100 p.s.i.g. The material is subsequently quenched in water and pelletized. The pellets are extracted with water at 90° C. for eight hours and dried under vacuum at 80° C. for 24 hours.

The graft copolymer thus prepared comprises repeating units of the following formula:

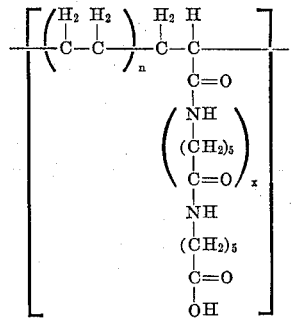

wherein each $n$ is an integer from 0 up and each $x$ is a cardinal number being at least 1, and wherein the ratio of the sum of $n$ to the sum of $x$ for the graft copolymer molecule is such that from about 75% to 95%, and preferably about 85 to 95%, by weight of the graft copolymer molecule is derived from e-caprolactam.

The pellets are extruded into film by heating them to from about 400 to about 550° F. and extruding them through a die, such as that disclosed in U.S. Pat. 3,241,183, onto a casting roll maintained at a temperature between about 100° F. and about 160° F., preferably between about 140° F. and about 160° F., and particularly between about 145° and 155° F.

Although additives, such as lubricants for example, may be added to the graft copolymer to facilitate handling and improve other properties, such additives do not materially affect the basic and novel adhesive characteristics of the resultant film.

Such an extrusion technique results in a low-crystalline film. For most adhesive purposes, the film extruded should have a thickness of less than about 10 mils, preferably less than about 6 mils and particularly between about 1 and about 4 mils.

Film extruded from the above graft copolymer using the above extrusion conditions has been found to be a superior adhesive for metals, particularly in the side seams of epoxy-phenolic resin coated tin-free steel cans.

An example of the manner of use of the adhesive of this invention is to position a strip of film of the desired length and width dimensions on a coated can blank, heat the film to a temperature from about 400 to about 650° F., preferably from about 450 to about 550° F., overlap the ends of the can blank in such a manner that the adhesive is in between the overlapping portions and apply a quick blow (for example 1/200 of a second) to the overlapping portions of the can to bond them to the heated adhesive strip.

Applicants have found that the above-identified graft copolymer has a melt viscosity that allows it to wet the surfaces of the can blank so as to allow the can to adhere itself thereto. Furthermore, the film adhesive of this invention has low-crystalline structure formed by utilizing a casting roll having a temperature in the range between about 140° and about 160° F. This low crystallinity is believed to be a critical factor in the adhesive properties of the film of this invention.

BRIEF DESCRIPTION OF THE DRAWING

The single figure of the drawing of this invention shows a can blank being formed into a cylindrical shape with the use of a film adhesive of the type disclosed herein.

DESCRIPTION OF THE PREFERRED EMBODIMENT

Referring more particularly to the drawing, reference numeral 10 indicates a can blank having overlapping ends 11 and 12. Reference numeral 13 indicates a strip of film adhesive positioned between overlapping ends 11 and 12. Reference numeral 15 indicates an anvil and reference numeral 14 indicates a hammer, the two being used together to apply a quick blow to the overlapping ends 11 and 12 of can blank 10 so as to bond them to adhesive film strip 13 to form a can body.

Cans were formed by the above described process using the adhesive film strip of this invention. The film strip contained about 10% by weight of the backbone copolymer. Samples of these cans were filled with beer and 2.8 volumes of carbon dioxide and were sealed and exposed to a temperature of about 130° F. for a period of 11 days. No leaks were observed. Corresponding tests using nylon 11 adhesive strips resulted in leaking containers.

It was found that cans could be formed significantly more rapidly by the above process using the graft copolymer films of this invention than by the same process using nylon 11 film.

Although this invention has been described with reference to the use of the subject film adhesives in adhering metal, and particularly in forming cans, it will be obvious to those skilled in the art that the subject film adhesives can to be utilized to bond other materials together, for example textiles, when the same or similar heat and pressure conditions of use are employed.

Although this invention has been described with particular reference to specific embodiments it is to be understood that the invention is to be limited solely by the scope of the appended claims.

We claim:

1. In a process for securing materials together comprising
   (a) positioning a plastic film between portions of material to be secured,
   (b) heating said film, and
   (c) applying to the portions of material sufficient pressure to bond said portions of material to said film, the improvement comprising using as said plastic film a low-crystalline graft copolymer film comprising repeating units of the formula

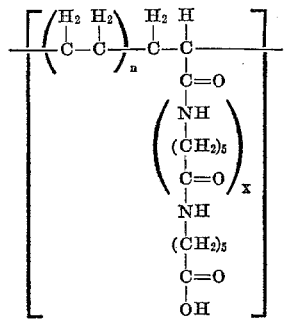

wherein $n$ is an integer from 0 up and $x$ is a cardinal number being at least 1, and wherein the ratio of the sum of $n$ to the sum of $x$ for the graft copolymer molecule is such that from about 75% to about 95% by weight of the graft copolymer molecule is derived from e-caprolactam.

2. The process of claim 1 wherein said materials are metal.

3. The process of claim 2 wherein said film is less than about 10 mils thick.

4. The process of claim 3 wherein said film is in the range from about 1 to about 4 mils thick.

5. The process of claim 2 wherein the material to be secured is tin-free epoxy-phenolic resin coated steel can making stock.

6. The process of claim 1 wherein said film is heated to a temperature between about 400° F. and about 650° F.

References Cited

UNITED STATES PATENTS 3,415,288  12/1968  Marshack _____ 156—218X
3,454,442   7/1969  Heller _____ 156—309X BENJAMIN R. PADGETT, Primary Examiner S. J. LECHERT, Jr., Assistant Examiner U.S. Cl. X.R.

156—157, 217, 218, 331; 161—219